(12) United States Patent
Hsu (10) Patent No.: US 8,668,113 B2
(45) Date of Patent: Mar. 11, 2014

(54) PROTECTIVE BAG

(71) Applicant: Fu-Yi Hsu, New Taipei (TW)

(72) Inventor: Fu-Yi Hsu, New Taipei (TW)

(*) Notice: Subject to any disclaimer, the term of this patent is extended or adjusted under 35 U.S.C. 154(b) by 0 days.

(21) Appl. No.: 13/873,362

(22) Filed: Apr. 30, 2013

(65) Prior Publication Data

US 2013/0240381 A1  Sep. 19, 2013

Related U.S. Application Data

(62) Division of application No. 13/227,438, filed on Sep. 7, 2011, now abandoned.

(30) Foreign Application Priority Data

Jul. 11, 2011 (TW) .............................. 100212737 U (51) Int. Cl.
*B65D 51/04* (2006.01)
*B65D 5/52* (2006.01)
*E05D 15/10* (2006.01)

(52) U.S. Cl.
USPC ............. 220/827; 220/810; 206/45.2; 16/388

(58) Field of Classification Search
USPC ......... 220/810, 827, 831, 832, 836, 838, 841, 220/843, 844, 845, 848; 206/45.2, 45.23, 206/320; 16/384, 388, 389, 387
See application file for complete search history.

(56) References Cited

U.S. PATENT DOCUMENTS

| | | | | |
|---|---|---|---|---|
| 2,258,306 A * | 10/1941 | Trollen | ........................... | 281/45 |
| 2,542,340 A * | 2/1951 | Mauraton | ....................... | 16/381 |
| 4,089,467 A * | 5/1978 | Makowicki | .................... | 220/315 |
| 5,167,049 A * | 12/1992 | Gibbs | ............................. | 16/253 |
| 6,941,616 B2 * | 9/2005 | Roy | ................................ | 16/254 |

* cited by examiner

*Primary Examiner* — Anthony Stashick
*Assistant Examiner* — Robert Stodola (57) ABSTRACT

A protective bag for a portable electronic device with a first body and a second body is provided. The first body may be carried on a carrying surface. The second body may be folded relative to the first body to cover the first body or unfolded relative to the first body to stand on the carrying surface. The protective bag comprises a first covering plate for covering a bottom surface of the first body, a second covering plate for covering a rear surface of the second body and at least a connecting component connected between the first covering plate and the second covering plate. When the bottom surface is carried on the carrying surface via the first covering plate and the second body is unfolded relative to the first body, the second covering plate stands on the carrying surface with a support provided by the connecting component.

16 Claims, 5 Drawing Sheets

PROTECTIVE BAG

This is a Divisional Application of U.S. patent application Ser. No. 13/227,438, filed Sep. 7, 2011, the contents of which is incorporated herein by reference in its entirety.

FIELD OF THE INVENTION

The present invention generally relates to a protective bag, and more particularly to a protective bag for a portable electronic device.

DESCRIPTION OF THE RELATED ART

With the development of technology, various portable electronic devices, such as a multimedia player (MP3, MP4 and so on), a cell phone, a personal digital assistant (PDA), a hand-held game console, an electronic book (E-book), a tablet personal computer (tablet PC), a netbook, a notebook and so on, have become an integral part of modern life to many people. To compare with the traditional desk PC, a main advantage of the portable electronic device is easy to get carried. Therefore, in recent years, we can see people operating the portable electronic devices anytime and anywhere.

In the above mentioned portable electronic devices, some are the hand-held game consoles, which comprise two bodies and these two bodies can be folded/unfolded relative to each other. One body has a pure screen and the other has another screen and a plurality of buttons. Also, for the netbooks and the notebooks, a screen and a keyboard are configured on two bodies, which can be folded/unfolded relative to each other. Accordingly, the screen can be supported by the other body to stand with an adjustable inclination, and thus the user can hold the device or put on a table to watch videos or operate.

Many users may use a protective sheath or a protective bag for the convenience of protecting and carrying the portable electronic device. Currently, there are two main design types about the commercial protective sheaths and the protective bags. In the first design type, one side edge of the sheath or the protective bag can be opened, and users must unzip a zipper or unlock a fastener to open the side edge to take the portable electronic device out of the protective sheath or bag to use, and that is inconvenient.

In contrast, in the second design type, three adjacent side edges of the protective sheath or bag are sealed with a zipper, the user can unzip the zipper to directly unfold the sheath or bag, and then the user may put the portable electronic device on an inner surface of the protective sheath or bag to use directly. Besides, there may has two elastic tapes, bands or belts disposed on the inner surface for banding or hanging two corners of the screen body of the portable electronic device, so as to avoid the protective sheath or bag directly dumping backward to collide with other things after being unfolded.

However, the screen body of the portable electronic device is getting thinner, and thus the screen body is not as easily to be banded tightly as usual. Hence, the elastic tapes, bands or belts may loosely hang on the screen body and thus the sight is affected when the screen body is flipped upward. Further, the elastic tapes, bands or belts may fall from the corners of the screen body when the screen body is flipped upward to a large angle, for example over 120 degrees. Moreover, in recent years, a gap between two bodies of the portable electronic device is designed to be narrower and narrower, and thus the elastic tapes. bands or belts are improper to band the screen body.

SUMMARY OF THE INVENTION

The present invention is directed to a protective bag, wherein a second cover thereof may stand on a carrying surface with a support provided by the connecting component The present invention provides a protective bag for a portable electronic device with a first body and a second body pivoted to the first body, wherein the first body is capable of being carried on a carrying surface, while the second body is capable of being folded relative to the first body for covering the first body or unfolded relative to the first body for standing on the carrying surface. Herein, the protective bag comprises a first covering plate, a second covering plate, and at least a connecting component. The first covering plate is capable of covering a bottom surface of the first body, the second covering plate is capable of covering a rear surface of the second body, and the connecting component is connected between a first side edge of the first covering plate and a second side edge of the second covering plate. In addition, the second covering plate stands on the carrying surface with a support provided by the connecting component or leans against the rear surface with an elastic restoring force provided by the connecting component when the bottom surface is carried on the carrying surface via the first covering plate and the second body is unfolded relative to the first body.

According to an embodiment of the present invention, the connecting component is an elastic component, and the second covering plate leans against the rear surface with the elastic restoring force provided by the elastic component when the second body is unfolded relative to the first body. Herein, the elastic component may be a plastic flat spring, a metal flat spring, a torsion spring, a spiral spring or a combination thereof. Besides, each of the first covering plate and the second covering plate may be a plastic plate or a metal plate. In addition, the first covering plate, the second covering plate and the elastic component are integrally formed by injection molding or thermoforming.

According to an embodiment of the present invention, the first covering plate, the second covering plate and the elastic component are connected by fastening, attaching with adhesive, screwing, riveting or a combination thereof.

According to an embodiment of the present invention, the connecting component is a gear wheel structure, a structure screwed with nuts or a shaft with a close fit structure, and the second covering plate stands on the carrying surface with a support provided by the connecting component when the second body is unfolded relative to the first body.

According to an embodiment of the present invention, the protective bag comprises only one connecting component connected between a middle portion of the first side edge and a middle portion of the second side edge. In addition, the protective bag comprises two connecting components connected between where adjacent to two ends of the first side edge and where adjacent to two ends of the second side edge. Alternatively, the protective bag comprises a plurality of connecting components arranged averagely between the first side edge and the second side edge.

According to an embodiment of the present invention, the first covering plate further has a first fastener disposed opposite to the first side edge, while the second covering plate further has a second fastener disposed opposite to the second side edge. The first fastener and the second fastener are capable of fastening to each other when the second body is folded relative to the first body for covering the first body, so as to hold the portable electronic device between the first covering plate and the second covering plate. Herein, the first fastener and the second fastener may be formed from a zipper set, a combination of a crochet belt and a velour belt (i.e. a Velcro®), a snap button set, permanent magnets with opposed polarities, a combination of a permanent magnet and a ferromagnetic material, a combination of a hook and a locking aperture, or a combination of a pin and an inserting aperture.

According to an embodiment of the present invention, the protective bag further comprises an inner material layer covering inner surfaces of the first covering plate, the second covering plate and the connecting component, so as to separate the portable electronic device from the first covering plate, the second covering plate and the connecting component. Herein, the inner material layer can be made from fiber cloth or other materials not likely to damage surfaces of the portable electronic device. In addition, the protective bag may further comprise a lining cushioning material layer disposed between the inner material layer and the inner surfaces. Herein, the lining cushioning material layer can be made from at least one of petroleum base foaming materials, extruded polyethylene (EPE), ethylene vinyl acetate copolymer resins (EVA resins or E/VAC resins), styrene butadiene rubbers (SBR), Standard Chinese Rubbers (SCR or SCR resins), memory foams and foam rubbers, or other materials for buffering.

According to an embodiment of the present invention, the protective bag further comprises an outer material layer covering outer surfaces of the first covering plate, the second covering plate and the connecting component. Herein, the outer material layer can be made from at least one of metal, plastic, leather, imitation leather, polyurethane (PU) and cloth, or formed from a surface coating or a surface treatment. Moreover, the protective bag can further comprise a lining cushioning material layer disposed between the outer material layer and the outer surfaces. Herein, the lining cushioning material layer can be made from at least one of petroleum base foaming materials, extruded polyethylene (EPE), ethylene vinyl acetate copolymer resins (EVA resins or E/VAC resins), styrene butadiene rubbers (SBR), Standard Chinese Rubbers (SCR or SCR resins), memory foams and foam rubbers, or other materials for buffering.

According to an embodiment of the present invention, the connecting component comprises at least a shaft, a first metal sheet, and a second metal sheet. The first metal sheet is fastened to the first covering plate, while the second metal sheet is fastened to the second covering plate. Moreover, the shaft is pivoted between a side edge of the first metal sheet distant from the first covering plate and a side edge of the second metal sheet distant from the second covering plate. In a preferred embodiment, at least one of the first metal sheet and the second metal sheet may comprise a main plate disposed on an inner surface of the first covering plate or an inner surface of the second covering plate, a first folded plate disposed on an outer surface of the first covering plate or an outer surface of the second covering plate, a second folded plate passing through the first covering plate or the second covering plate and connected between the main plate and the first folded plate, and a pivoting portion disposed to a side edge of the main plate opposite to the second folded plate and pivoted to the shaft. Herein, at least one of the first covering plate and the second covering plate may have a first dent on the inner surface, a second dent on the outer surface and a slit extending from the inner surface to the outer surface. Moreover, part of the main plate is embedded within the first dent, the first folded plate is embedded within the second dent, and the second folded plate is embedded within the slit. Further, the connecting component may comprise two shafts, and each of the pivoting portions of the first metal sheet and the second metal sheet may comprise two circular folded plates and a connecting plate, wherein each of the shafts is fitted into one of the circular folded plates of the first metal sheet and a corresponding one of the circular folded plates of the second metal sheet, and the connecting plate is connected between the main plate and the circular folded plates. Furthermore, the connecting plate of one of the first metal sheet and the second metal sheet may have a gap formed between the circular folded plates thereof, and both of the circular folded plates of the other one of the first metal sheet and the second metal sheet may be located within the gap. In a preferred embodiment, the shaft may be a combination of a nut and a bolt, while at least one of the first metal sheet and the second metal sheet may be fastened to the first covering plate and/or the second covering plate by melt bonding, fastening, attaching with adhesive, screwing, riveting or a combination thereof.

Accordingly, the second covering plate of the protective bag can stand on the carrying surface with a support provided by the connecting component when the bottom surface of the first body of the portable electronic device is carried on the carrying surface via the first covering plate and the second body of the portable electronic device is unfolded relative to the first body. Therefore, the protective bag provided in the present invention is sightlier in use and the second covering plate thereof is not likely to directly dump backward to collide with other things after being unfolded.

DETAILED DESCRIPTION OF THE INVENTION

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations are not described in detail in order not to obscure the present invention.

Figure 1:
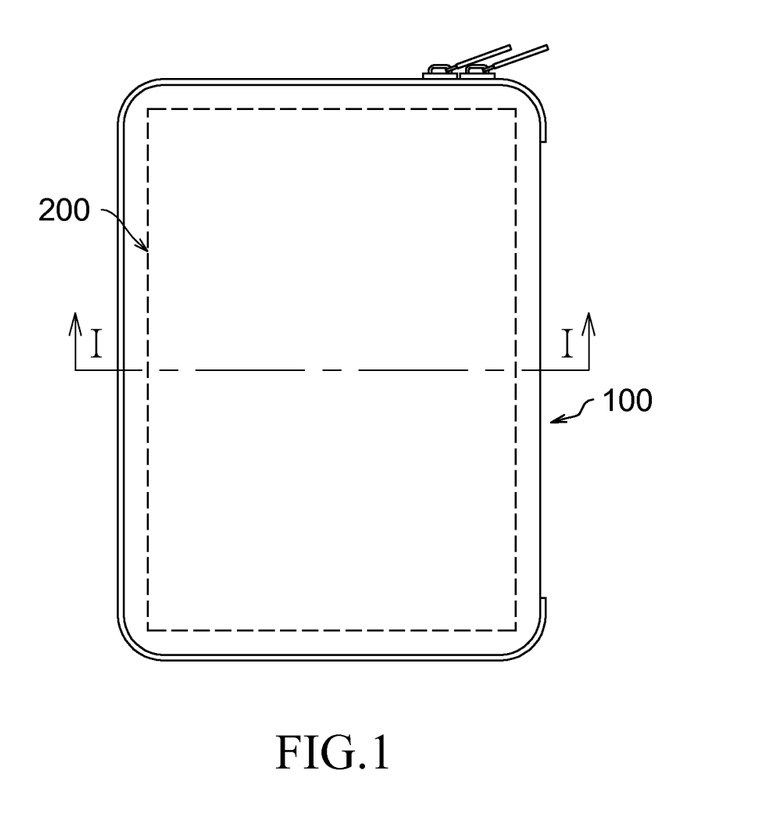
FIG. 1 illustrates a top view of a protective bag according to an embodiment of the present invention.
Figure 2:
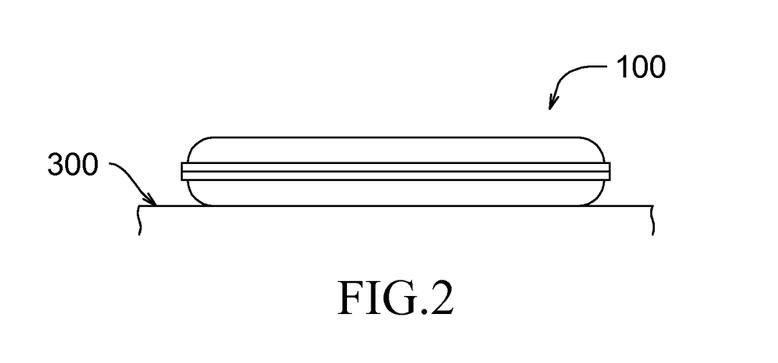
FIG. 2 illustrates a front view of the protective bag as illustrated in FIG. 1.
Figure 3:
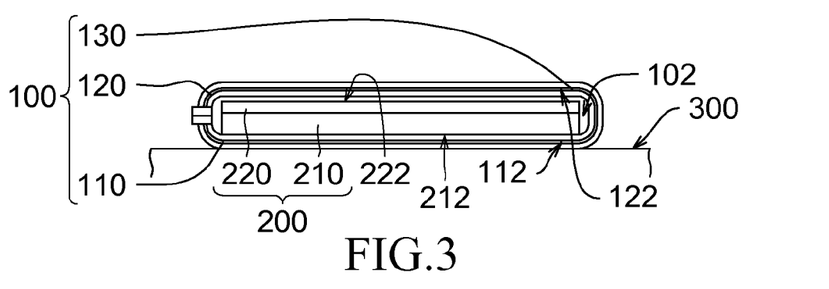
FIG. 3 illustrates a cross-sectional view of the protective bag along the line I-I as illustrated in FIG. 1.
Figure 4:
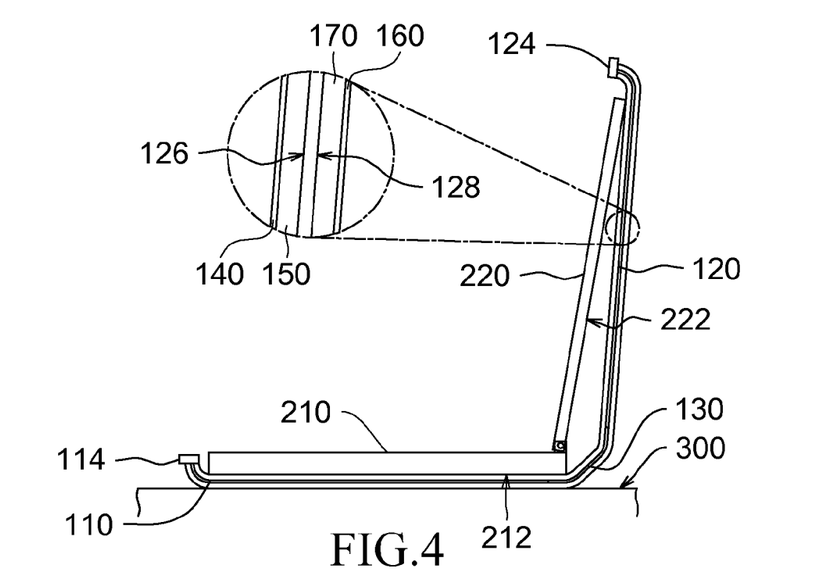
FIG. 4 illustrates a cross-sectional view of the protective bag in a first state along the line I-I as illustrated in FIG. 1.
Figure 5:
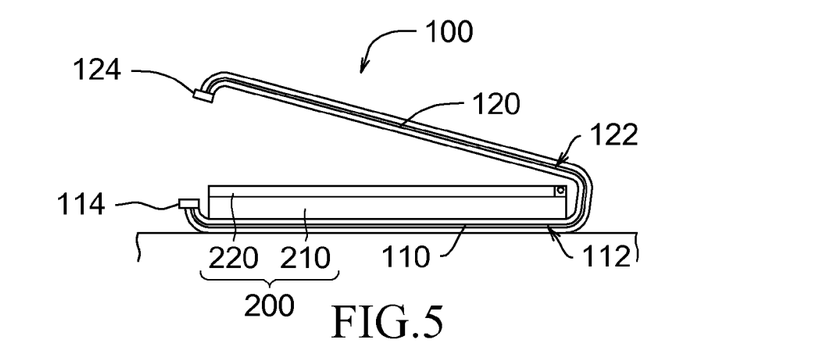
FIG. 5 illustrates a cross-sectional view of the protective bag in a second state along the line I-I as illustrated in FIG. 1.
Figure 6:
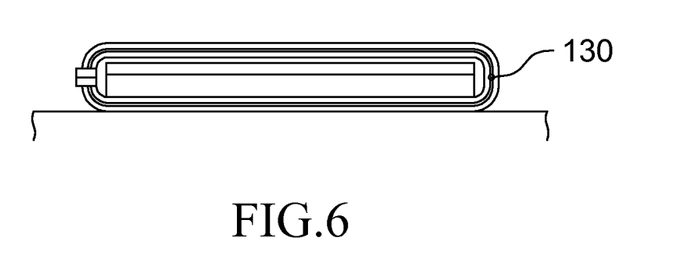
FIG. 6 illustrates a cross-sectional view of a protective bag in a first state according to another embodiment of the present invention.
Figure 7:
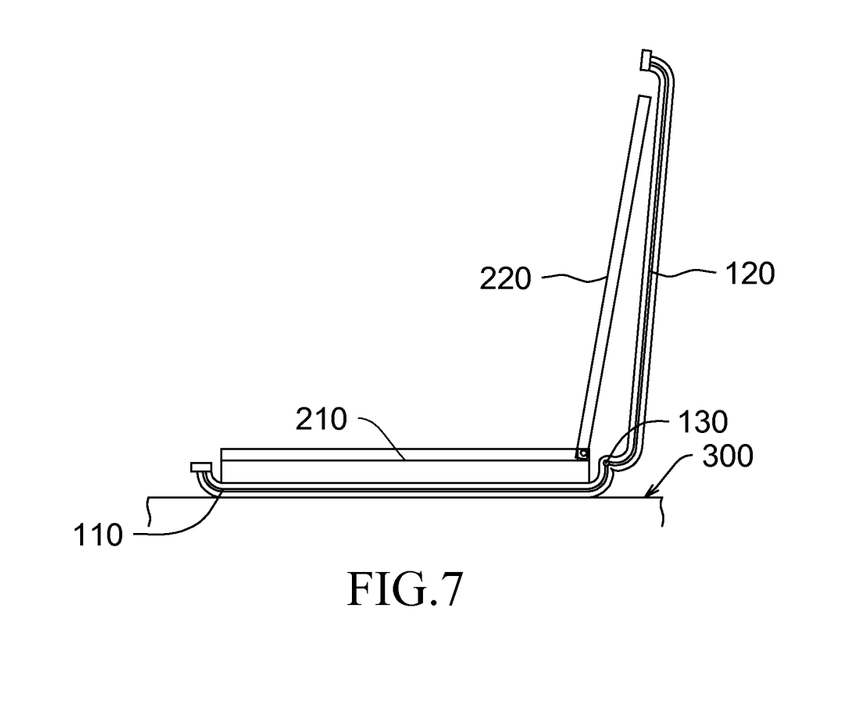
FIG. 7 illustrates a cross-sectional view of the protective bag in a second state as illustrated in FIG. 6.

FIG. 1 illustrates a top view of a protective bag according to an embodiment of the present invention, and FIG. 2 illustrates a front view of the protective bag as illustrated in FIG. 1. In addition, FIG. 3 illustrates a cross-sectional view of the protective bag along the line I-I as illustrated in FIG. 1. Furthermore, FIG. 4 illustrates a cross-sectional view of the protective bag in a first state along the line I-I as illustrated in FIG. 1, and FIG. 5 illustrates a cross-sectional view of the protective bag in a second state along the line I-I as illustrated in FIG. 1. FIG. 6 illustrates a cross-sectional view of a protective bag in a first state according to another embodiment of the present invention, and FIG. 7 illustrates a cross-sectional view of the protective bag in a second state as illustrated in FIG. 6. Referring to FIG. 1, FIG. 2 and FIG. 3 first, the protective bag 100 of the present invention may use to contain a portable electronic device 200, wherein the portable electronic device 200 has a first body 210 and a second body 220 pivoted to the first body 210.

In the present embodiment, the portable electronic device 200 as illustrated herein is a notebook. Besides, the part of the notebook disposed with the keyboard is the first body 210 as illustrated in this embodiment, which is capable of being carried on a carrying surface 300, while the part of the notebook disposed with the screen is the second body 220 as illustrated in the present embodiment, which is capable of being folded relative to the first body 210 for covering the first body 210, or unfolded relative to the first body 210 for standing on the carrying surface 300. Further, in other non-illustrated embodiments, the portable electronic devices may also be practiced to a netbook, a hand-held game console or the other kinds of portable electronic devices having two bodies capable of being folded or unfolded relative to each other.

The protective bag 100 comprises a first covering plate 110, a second covering plate 120 and at least a connecting component 130 connected between a first side edge 112 of the first covering plate 110 and a second side edge 122 of the second covering plate 120. In addition, the first covering plate 110 may further has a first fastener 114 disposed opposite to the first side edge 112, while the second covering plate 120 may further has a second fastener 124 disposed opposite to the second side edge 122. In this embodiment, the protective bag 100 comprises only one connecting component 130 connected between a middle portion of the first side edge 112 and a middle portion of the second side edge 122. However, in other non-illustrated embodiments, the protective bag may comprise two connecting components connected between where adjacent to two ends of the first side edge and where adjacent to two ends of the second side edge, or a plurality of connecting components arranged averagely between the first side edge and the second side edge.

Moreover, as illustrate in FIG. 3, the first covering plate 110 and the second covering plate 120 may be folded relative to each other about the connecting component 130 formed as a shaft, so as to form a containing space 102 for containing the portable electronic device 200. Herein, the first covering plate 110 covers a bottom surface 212 of the first body 210, the second covering plate 120 covers a rear surface 222 of the second body 220, and the first fastener 114 and the second fastener 124 are capable of fastening together, so as to hold the portable electronic device 200 between the first covering plate 110 and the second covering plate 120. Thereafter, as illustrated in FIG. 4, the bottom surface 212 may be carried on the carrying surface 300 via the first covering plate 110, and the second covering plate 120 may stand on the carrying surface 300 with a support provided by the connecting component 130 or lean against the rear surface 222 after users unlock the first fastener 114 and the second fastener 124 and then unfolded the second body 220 relative to the first body 210.

In detail, in the present embodiment, the first fastener 114 and the second fastener 124 may be formed from a zipper set. Furthermore, each of the first covering plate 110 and the second covering plate 120 may be a plastic plate, the connecting component 130 may be a U-shaped plastic flat spring, and the first covering plate 110, the second covering plate 120 and the component 130 may be integrally formed by injection molding or thermoforming. However, in the other embodiments, the first covering plate 110, the second covering plate 120 and the component 130 may be connected by a manner such as fastening, attaching with adhesive, screwing, riveting and so on. As illustrated in FIG. 4, when a user is unfolding the second body 220 relative to the first body 210 after the first fastener 114 and the second fastener 124 are unlock (i.e. after the zipper set is unzipped), the second covering plate 120 is unfolded relative to the first covering plate 110 about the connecting component 130 by the second body 220, and thus the connecting component 130 is elastically deformed. At this time, the second covering plate 120 leans against the rear surface 222 with an elastic restoring force provided by the connecting component 130, so as to stand on the carrying surface 300. Therefore, the second covering plate 120 is not only sightlier in use, but also not likely to dump backward to collide with other things after being unfolded.

Furthermore, in the other non-illustrated embodiments, each of the first covering plate and the second covering plate may be made from a metal material or any other solid material capable of letting the connecting component deform elastically and being rotated about the connecting component with the elastic restoring force provided by the connecting component. Besides, the connecting component can further be a metal flat spring, a torsion spring, a spiral spring, any other elastic component with the same functions or a combination thereof. In addition, a range of motion of an angle formed between the first covering plate 110 and the second covering plate 120 is ranged from 0 degree to 150 degrees, so as to avoid forming an elastic fatigue of the elastic component due to an unfolded angle between the first covering plate 110 and the second covering plate 120 is too large.

It should be noted that a free angle of the elastic component may be preset as larger than 0 degree, for example 15 degrees as illustrate in FIG. 5. In such instance, the second covering plate 120 is unfolded automatically relative to the first covering plate 110 as long as the first fastener 114 and the second fastener 124 are unlocked, and thus it is convenient for users not only taking the portable electronic device 200 out of the protective bag 100 but also unfolding the first body 210 relative to the second body 220. As a result, the protective bag 100 is more convenient in use.

Moreover, referring to FIG. 6 and FIG. 7, the connecting component 130 may also be a shaft with a close fit structure commonly used in current notebooks. Hence, as illustrate in FIG. 6, an included angle between the first covering plate 110 and the second covering plate 120 may be maintained with a friction provided by the close fit structure of the connecting component 130. In another word, the second covering plate 120 may stand on the carrying surface 300 with a support provided by the connecting component 130.

Figure 8:
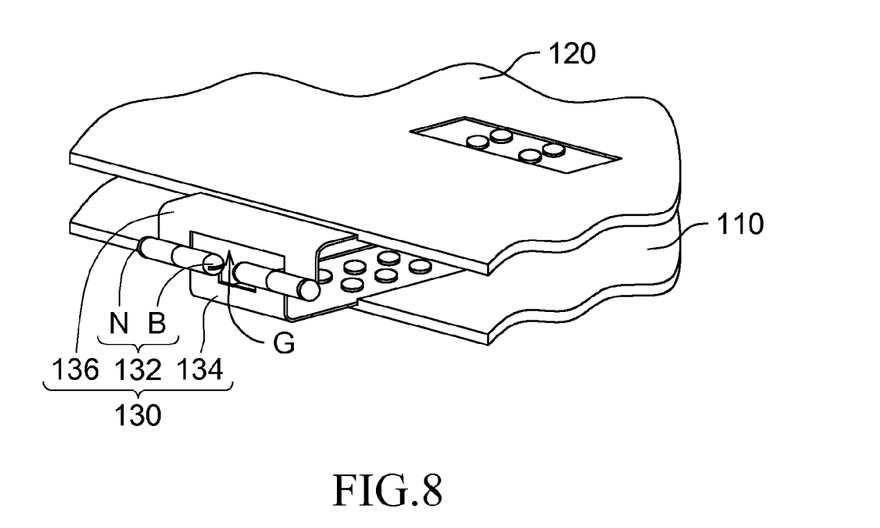
FIG. 8 illustrates a perspective view of a shaft with a close fit structure connecting the first covering plate and the second covering plate according to an embodiment of the present invention.
Figure 9:
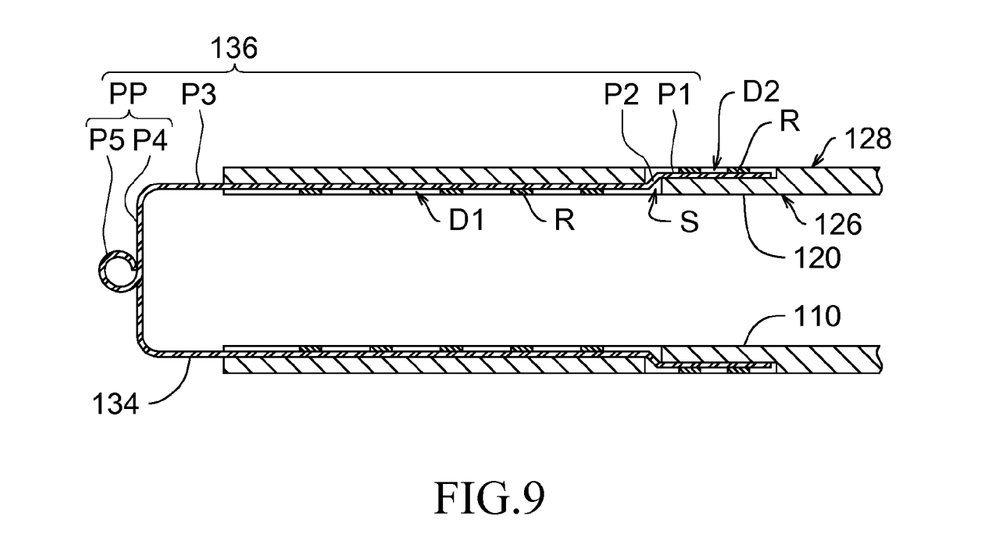
FIG. 9 illustrates a cross-sectional view of the shaft with the close fit structure as illustrated in FIG. 8.
Figure 10:
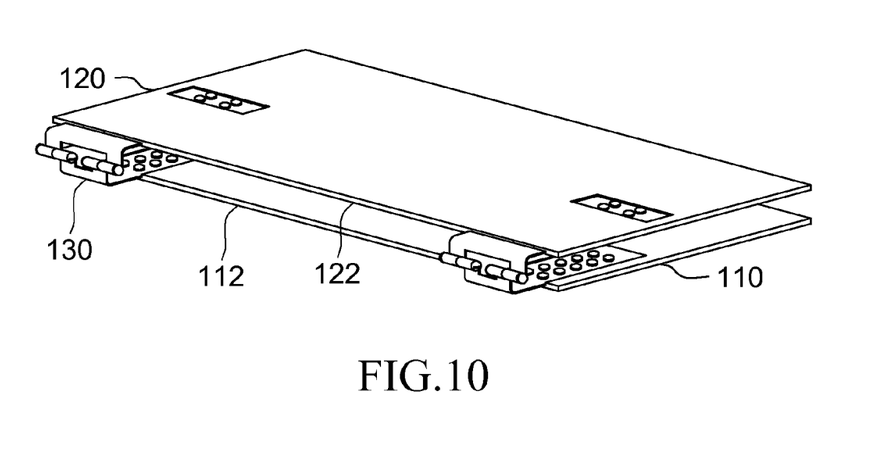
FIG. 10 illustrates a perspective view of two sets of shaft with close fit structure connecting the first covering plate and the second covering plate according to an embodiment of the present invention.
Figure 11:
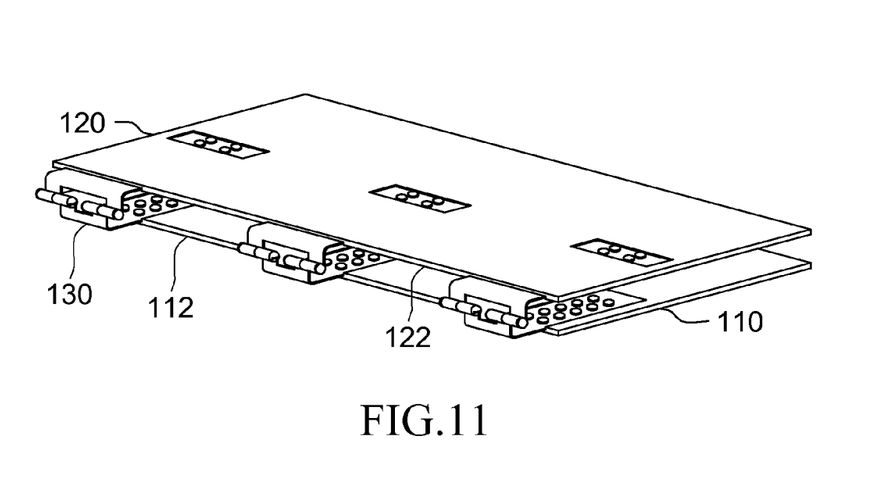
FIG. 11 illustrates a perspective view of three sets of shaft with close fit structure connecting the first covering plate and the second covering plate according to an embodiment of the present invention.

FIG. 8 illustrates a perspective view of a shaft with a close fit structure connecting the first covering plate and the second covering plate according to an embodiment of the present invention, and FIG. 9 illustrates a cross-sectional view of the shaft with the close fit structure as illustrated in FIG. 8. FIG. 10 illustrates a perspective view of two sets of shaft with close fit structure connecting the first covering plate and the second covering plate according to an embodiment of the present invention, and FIG. 11 illustrates a perspective view of three sets of shaft with close fit structure connecting the first covering plate and the second covering plate according to an embodiment of the present invention. Referring to FIG. 8 and FIG. 9 together, in a preferred embodiment, the connecting component 130 can comprise at least a shaft 132, a first metal sheet 134, and a second metal sheet 136. As illustrated in FIG. 8, in the present embodiment, the connecting component 130 comprises two shafts 132, and each of the shafts 132 is a combination of a nut N and a bolt B, so as to form the close fit structure, wherein a tightness provided by the shafts 132 may be adjusted by tightening or releasing the bolts B with the nuts N. Besides, each of the shafts 132 may provide a torque ranged from 3.5 to 5.5 kgf-cm. In addition, a range of motion of an angle formed between the first metal sheet 134 and the second metal sheet 136 may be ranged from 0 degree to 345 degrees.

The first metal sheet 134 is fastened to the first covering plate 110, the second metal sheet 136 is fastened to the second covering plate 120, and both of the shafts 132 are pivoted between a side edge of the first metal sheet 134 distant from the first covering plate 110 and a side edge of the second metal sheet 136 distant from the second covering plate 120. The detail structures of the second metal sheet 136 and the connection between the second covering plate 120 and the second metal sheet 136 are described herein after, while the detail structures of the first metal sheet 134 and the connection between the first covering plate 110 and the first metal sheet 134 are omitted herein due to similar to that of the second metal sheet 136.

In detail, referring to FIG. 9, the second covering plate 120 in the present embodiment may further have an inner surface 126, an outer surface 128, a first dent D1 formed on the inner surface 126, a second dent D2 formed on the outer surface 128 and a slit S extending from the inner surface 126 to the outer surface 128. Besides, the second metal sheet 136 in the present embodiment comprises a first folded plate P1, a second folded plate P2, a main plate P3, and a pivoting portion PP, wherein the pivoting portion PP comprises a connecting plate P4 and two circular folded plates P5 (as shown in FIG. 8). The first folded plate P1 is embedded within the second dent D2. The second folded plate P2 is connected between the first folded plate P1 and the main plate P3 and embedded within the slit S, i.e. the second folded plate P2 passes through the second covering plate 120. Part of the main plate P3 is embedded within the first dent D1, and the other part of the main plate P3 is extended outside of the second covering plate 120. The connecting plate P4 is connected between a side edge of the main plate P3 opposite to the second folded plate P2 and the two circular folded plates P5.

Besides, each of the shafts 132 is fitted into one of the circular folded plates P5 of the first metal sheet 134 and a corresponding one of the circular folded plates P5 of the second metal sheet 136. Thus, the first covering plate 110 and the second covering plate 120 may be folded and unfolded relative to each other by the connecting component 130. It should be noted that since the tightness provided by the shaft 132 may be adjusted by tightening the bolt B with the nut N, the second covering plate 120 may stand on the carrying surface 300 with a support provided by the connecting component 130. Furthermore, as illustrated in FIG. 8, in the present preferred embodiment, the connecting plate P4 (illustrated in FIG. 9) of the second metal sheet 136 may have a gap G formed between the circular folded plates P5 (illustrated in FIG. 9), and both of the circular folded plates P5 (illustrated in FIG. 9) of the first metal sheet 134 are located within the gap G, and vice versa. In addition, as illustrated in FIG. 9, each of the first covering plate 110 and the second covering plate 120 may further comprise a plurality of enforcing rods R protruding from the bottom surfaces of the first dent D1 and the second dent D2 and passing through the first folded plate P1 and the main plate P3, so as to tightly fasten the first folded plate P1 and the main plate P3 on the first covering plate 110 and the second covering plate 120 respectively.

However, in the other non-illustrated embodiments, the structure of at least one of the first metal sheet and the second metal sheet as illustrated in FIG. 8 and FIG. 9 for fastening to the first covering plate and/or the second covering plate may further be replaced by a manner such as melt bonding, fastening, attaching with adhesive, screwing, riveting or a combination thereof. Furthermore, the connecting component may further be practiced by a gear wheel structure, a structure screwed with nuts or other pivot structures commonly used in current notebooks as well. Besides, the first fastener may further be a crochet belt of a Velcro®, a male snap button of a snap button set, a permanent magnet, a hook or a pin, while the second fastener may further be a velour belt of the Velcro®, a female snap button of the snap button set, a ferromagnetic material, a locking aperture or a inserting aperture, and vice versa. Alternatively, the first fastener and the second fastener may be permanent magnets with opposed polarities as well. In other embodiments, the protective bag may also comprise two connecting components 130 connected between the first side edge 112 of the first covering plate 110 and the second side edge 122 of the second covering plate 120 as illustrated in FIG. 10, wherein one of the connecting components 130 is located adjacent to the left end of the first side edge 112 and the left end of the second side edge 122, while the other one of the connecting components 130 is located adjacent to the right end of the first side edge 112 and the right end of the second side edge 122. Alternatively, the protective bag may comprise a plurality of connecting components 130 arranged with equally spaces between the first side edge 112 of the first covering plate 110 and the second side edge 122 of the second covering plate 120 as illustrated in FIG. 11.

Referring to FIG. 4 again, it should be noted that the connecting component 130 and the first covering plate 110 and the second covering plate 120 made from solid materials may damage the bottom surface 212 and the rear surface 222 of the portable electronic device 200 in use, and thus the protective bag 100 is recommend to comprise an inner material layer 140. The inner material layer 140 covers the inner surfaces 126 of the first covering plate 110, the second covering plate 120 and the connecting component 130 (for simplifying the figure, the inner surfaces of the first covering plate 110 and the connecting component 130 are not illustrated in FIG. 4) for separating the portable electronic device 200 from the first covering plate 110, the second covering plate 120 and the connecting component 130, and is made from fiber cloth or other materials not likely to damage surfaces of the portable electronic device. Besides, the protective bag 100 may further comprise a lining cushioning material layer 150 disposed between the inner material layer 140 and the inner surfaces 126. In the present embodiment, the lining cushioning material layer 150 may be made from at least one of petroleum base foaming materials, EPE, EVA resins or E/VAC resins, SBR, SCR or SCR resins, memory foams and foam rubbers, or other materials for buffering. In addition, the inner material layer 140 may made from the above mentioned materials for buffering as well. In another word, the materials for buffering can also be exposed directly without covering the fiber cloth or the other materials for avoiding damaging the surfaces of the portable electronic device 200 as long as it is ensured that the materials for buffering is not likely to damage the surfaces of the portable electronic device 200.

Similarly, the protective bag 100 may comprise an outer material layer 160 covering outer surfaces 128 of the first covering plate 110, the second covering plate 120 and the connecting component 130 (for simplifying the figure, the outer surfaces of the first covering plate 110 and the connecting component 130 are not illustrated in FIG. 4) as well, and may be made from at least one of metal, plastic, leather, imitation leather, PU and cloth, or purely formed from a surface coating or a surface treatment. Besides, the protective bag 100 may comprise another lining cushioning material layer 170 disposed between the outer material layer 160 and the outer surfaces 128 as well. Similarly, the lining cushioning material layer 170 may be made from at least one of petroleum base foaming materials, EPE, EVA resins or E/VAC resins, SBR, SCR or SCR resins, memory foams and foam rubbers, or other materials for buffering.

It should be noted that the present invention should not be limited to the foregoing embodiments. In the other non-illustrated embodiments, the protective bag may further not comprise the first fastener and the second fastener. In such instance, the first covering plate and the second covering plate may also hold the portable electronic device therebetween by the elastic restoring force or the friction provided by the connecting component. Besides, the protective bag may further comprise at least one of a shoulder strap, a backpack strap and a carrying strap, and thus the protective bag is more convenient to be carried.

In summary, in the present invention, the second covering plate is capable of standing on the carrying surface with a support provided by the connecting component, and thus the protective bag provided in the present invention is sightlier in use and the second covering plate thereof is not likely to directly dump backward to collide with other things after being unfolded. When the connecting component is practiced by using the elastic component, the free angle of the elastic component may be preset as larger than 0 degree, so as to let the second covering plate being unfolded automatically relative to the first covering plate as long as the first fastener and the second fastener are unlocked, and thus the protective bag is more convenient in use.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A protective bag for a portable electronic device, wherein the portable electronic device has a first body and a second body pivoted to the first body, the first body is capable of being carried on a carrying surface, while the second body is capable of being folded relative to the first body for covering the first body or unfolded relative to the first body for standing on the carrying surface, and the protective bag comprises:

a first covering plate, capable of covering a bottom surface of the first body;
a second covering plate, capable of covering a rear surface of the second body; and
at least a connecting component, connected between a first side edge of the first covering plate and a second side edge of the second covering plate, and comprises:
  a first metal sheet, fastened to the first covering plate;
  a second metal sheet, fastened to the second covering plate; and
  at least a shaft, pivoted between a side edge of the first metal sheet distant from the first covering plate and a side edge of the second metal sheet distant from the second covering plate, so that the second covering plate stands on the carrying surface with a support provided by the connecting component when the bottom surface is carried on the carrying surface via the first covering plate and the second body is unfolded relative to the first body, wherein at least one of the first metal sheet and the second metal sheet comprises:
    a main plate, disposed on an inner surface of the first covering plate or an inner surface of the second covering plate;
    a first folded plate, disposed on an outer surface of the first covering plate or an outer surface of the second covering plate;
    a second folded plate, passing through the first covering plate or the second covering plate, and connected between the main plate and the first folded plate; and
    a pivoting portion, disposed to a side edge of the main plate opposite to the second folded plate and pivoted to the shaft.

2. The protective bag as claimed in claim 1, comprising one connecting component, wherein the connecting component is connected between a middle portion of the first side edge and a middle portion of the second side edge.

3. The protective bag as claimed in claim 1, comprising two connecting components, wherein the connecting components are connected between the first side edge and the second side edge, one of the connecting components is located adjacent to one end of the first side edge and one end of the second side edge, and the other one of the connecting components is located adjacent to the other end of the first side edge and the other end of the second side edge.

4. The protective bag as claimed in claim 1, comprising a plurality of connecting components, wherein the connecting components are arranged with equal spaces between the first side edge and the second side edge.

5. The protective bag as claimed in claim 1, wherein the first covering plate further has a first fastener disposed opposite to the first side edge, the second covering plate further has a second fastener disposed opposite to the second side edge, and the first fastener and the second fastener are capable of fastening to each other when the second body is folded relative to the first body for covering the first body, so as to hold the portable electronic device between the first covering plate and the second covering plate.

6. The protective bag as claimed in claim 5, wherein the first fastener and the second fastener are formed from a zipper set, a snap button set, permanent magnets with opposed polarities, or a combination of a permanent magnet and a ferromagnetic material.

7. The protective bag as claimed in claim 1, further comprising an inner material layer, wherein the inner material layer covers inner surfaces of the first covering plate, the second covering plate and the connecting component, so as to separate the portable electronic device from the first covering plate, the second covering plate and the connecting component.

8. The protective bag as claimed in claim 7, further comprising a lining cushioning material layer, wherein the lining cushioning material layer is disposed between the inner material layer and the inner surfaces.

9. The protective bag as claimed in claim 1, further comprising an outer material layer, wherein the outer material layer covers outer surfaces of the first covering plate, the second covering plate and the connecting component.

10. The protective bag as claimed in claim 9, further comprising a lining cushioning material layer, wherein the lining cushioning material layer is disposed between the outer material layer and the outer surfaces.

11. The protective bag as claimed in claim 1, wherein at least one of the first covering plate and the second covering plate has a first dent on the inner surface, a second dent on the outer surface and a slit extending from the inner surface to the outer surface, part of the main plate is embedded within the first dent, the first folded plate is embedded within the second dent, and the second folded plate is embedded within the slit.

12. The protective bag as claimed in claim 1, wherein the connecting component comprises two shafts, and each of the pivoting portions of the first metal sheet and the second metal sheet comprises:

two circular folded plates, wherein each of the shafts is fitted into one of the circular folded plates of the first metal sheet and a corresponding one of the circular folded plates of the second metal sheet; and a connecting plate connected between the main plate and the circular folded plates.

13. The protective bag as claimed in claim 12, wherein the connecting plate of one of the first metal sheet and the second metal sheet has a gap formed between the circular folded plates thereof, and both of the circular folded plates of the other one of the first metal sheet and the second metal sheet are located within the gap.

14. The protective bag as claimed in claim 1, wherein the shaft is a combination of a nut and a bolt.

15. The protective bag as claimed in claim 1, wherein the first metal sheet is fastened to the first covering plate by melt bonding, fastening, attaching with adhesive, screwing, riveting or a combination thereof.

16. The protective bag as claimed in claim 1, wherein the second metal sheet is fastened to the second covering plate by melt bonding, fastening, attaching with adhesive, screwing, riveting or a combination thereof.

* * * * *